Patented Nov. 28, 1933

1,936,830

UNITED STATES PATENT OFFICE 1,936,830

PROCESS OF MAKING CADMIUM SULPHATE

Harry P. Corson, Lakewood, Ohio, assignor to The Grasselli Chemical Company, Cleveland, Ohio, a corporation of Delaware No Drawing. Application November 8, 1932
Serial No. 641,759

3 Claims. (Cl. 23—117)

The present invention refers to a process of making cadmium sulphate by dissolving cadmium metal in hot, dilute sulphuric acid and is particularly characterized by contacting the reaction mixture with a gas containing oxygen at a pressure greater than corresponds to the partial pressure of oxygen in atmospheric air at the temperature of the reaction mixture.

Metallic cadmium in the form of bars, mossy cadmium or shot cadmium dissolves very slowly in sulphuric acid. In fact the rate of solution is so slow that the process of making cadmium sulphate by the direct attack of the metal with sulphuric acid is a very tedious operation. I have, for instance, found that by boiling feathered cadmium for 48 hours in 20% sulphuric acid only 6% of the metal was dissolved.

I have found that the solution of cadmium metal in hot, dilute sulphuric acid is greatly speeded up if I introduce an oxygen containing gas into the reaction mixture and maintain the pressure of such introduced oxygen at a value greater than the partial pressure of oxygen in atmospheric air.

There are two convenient manners of producing oxygen of a pressure greater than its partial pressure in the atmosphere. One is to use a gas of a greater oxygen content than air. The upper limit for this is, of course, pure oxygen. The other manner is to use compressed air, in which case the relative pressures of oxygen and the inert constituents of the atmosphere remain the same, but the absolute pressure of the oxygen is increased.

Both these methods are available for use in my novel process, though the use of compressed air is preferred for economical reasons mainly.

I charge, for instance, a lead lined autoclave with pieces of metallic cadmium and dilute sulphuric acid, for instance, from 10 to 20%, introduce live steam to heat the charge and then compressed air, maintaining by means of a vent valve a pressure of say from 20 to 75 lb. gauge. The cadmium metal readily dissolves. The acid is neutralized and the corresponding amount of cadmium is dissolved in a few hours instead of many days as is required at atmospheric pressure and in the absence of compressed air.

While temperatures above 100° C., as can be obtained in an autoclave operation, are advantageous for a speedy dissolving of the cadmium metal, I can even operate below 100° C., for instance from 75° C. up provided a pressure greater than atmospheric is maintained in the autoclave by the introduction of compressed air.

The so obtained cadmium sulphate solution is then worked up in well known manner for the production of crystalline cadmium sulphate or is available for any of its uses.

I claim:

1. In a process of producing cadmium sulphate by the action of hot, dilute sulphuric acid upon metallic cadmium, the step of introducing into the reaction mixture a gas containing free oxygen in which the pressure of the free oxygen is substantially greater than the partial pressure of oxygen in atmospheric air at the temperature of the reaction mixture.

2. In a process of producing cadmium sulphate by the action of hot, dilute sulphuric acid upon metallic cadmium, the step of introducing into the reaction mixture a gas containing more free oxygen than is contained in atmospheric air.

3. In a process of making cadmium sulphate the steps of dissolving cadmium metal in hot, dilute sulphuric acid and introducing compressed air into the reaction mixture while maintaining it at super atmospheric pressure.

HARRY P. CORSON.